(12) United States Patent
Dinkar et al.

(10) Patent No.: US 8,849,773 B2
(45) Date of Patent: Sep. 30, 2014

(54) METHODS AND APPARATUS FOR ACTIVE OPTIMIZATION OF DATA

(75) Inventors: Abhijit Dinkar, San Jose, CA (US); Vinod Jayaraman, San Francisco, CA (US); Murali Bashyam, Fremont, CA (US); Goutham Rao, Los Altos Hills, CA (US)

(73) Assignee: Dell Products L.P., Round Rock, TX (US)

( * ) Notice: Subject to any disclaimer, the term of this patent is extended or adjusted under 35 U.S.C. 154(b) by 205 days.

(21) Appl. No.: 13/041,282

(22) Filed: Mar. 4, 2011

(65) Prior Publication Data

US 2011/0270810 A1 Nov. 3, 2011

Related U.S. Application Data

(60) Provisional application No. 61/329,016, filed on Apr. 28, 2010.

(51) Int. Cl.
*G06F 17/30* (2006.01)
(52) U.S. Cl.
CPC .... *G06F 17/30156* (2013.01); *G06F 17/30153* (2013.01)
USPC ............................ 707/692; 707/693; 707/802
(58) Field of Classification Search
USPC ....................................................... 707/692
See application file for complete search history.

(56) References Cited

U.S. PATENT DOCUMENTS 7,921,077 B2 * 4/2011 Ting et al. ...................... 707/610
2011/0138154 A1 * 6/2011 Tevis et al. ..................... 712/220

OTHER PUBLICATIONS

"Technical Report: NetApp Deduplication for FAS Deployment and Implementation Guide", *NetApp, Inc., 4th Revision*, [Online]. Retrieved from the Internet: <https://communities.netapp.com/servlet/JiveServlet/previewBody/1702-102-1-1921/technical%20report-%20Netapp%20A-SIS%20Deduplication%20-%20Deployment%20and%20Implementation%20Guide-4th%20Revision.pdf>,(Apr. 16, 2008),28 pgs.
NG, Chun-Ho et al., "Live Deduplication Storage of Virtual Machine Images in an Open-Source Cloud", *Chinese University of Hong Kong, Dept. of Computer Science and Engineering*, [Online]. Retrieved from the Internet: <http://www.cse.cuhk.edu.hk/~pclee/www/pubs/middleware11.pdf >,(Accessed on May 23, 2012),20 pgs.

* cited by examiner

*Primary Examiner* — Belix M Ortiz Ditren
(74) *Attorney, Agent, or Firm* — Kwan & Olynic LLP

(57) ABSTRACT

Techniques and mechanisms are provided to support live file optimization. Active I/O access to an optimization target is monitored during optimization. Active files need not be taken offline or made unavailable to an application during optimization and retain the ability to support file operations such as read, write, unlink, and truncate while an optimization engine performs deduplication and/or compression on active file ranges.

20 Claims, 7 Drawing Sheets

Figure 4A

| Filemap File X 401 | | |
|---|---|---|
| Offset 403 | Index 405 | Lname 407 |
| 0K | 0.1 | NULL |
| 8K | 0.2 | NULL |
| 16K | 0.3 | NULL |

Figure 4B

| Datastore Suitcase 471 | | |
|---|---|---|
| Data Table 451 | | |
| Index 453 | Data Offset 455 | Data Reference Count 457 |
| 1 | Offset-Data A | 1 |
| 2 | Offset-Data B | 1 |
| 3 | Offset-Data C | 1 |
| | Datastore | |
| | Data 461 | Last File 463 |
| 1 | Data A | File X 401 |
| 2 | Data B | File X 401 |
| 3 | Data C | File X 401 |

Figure 5

| Dictionary 501 ||
|---|---|
| Hash 511 | Storage Location 521 |
| a | Location 523 |
| b | Location 525 |
| c | Location 527 |

| Dictionary 551 ||
|---|---|
| Hash 551 | Storage Location 571 |
| i | Location 573 |
| j | Location 575 |
| k | Location 577 |

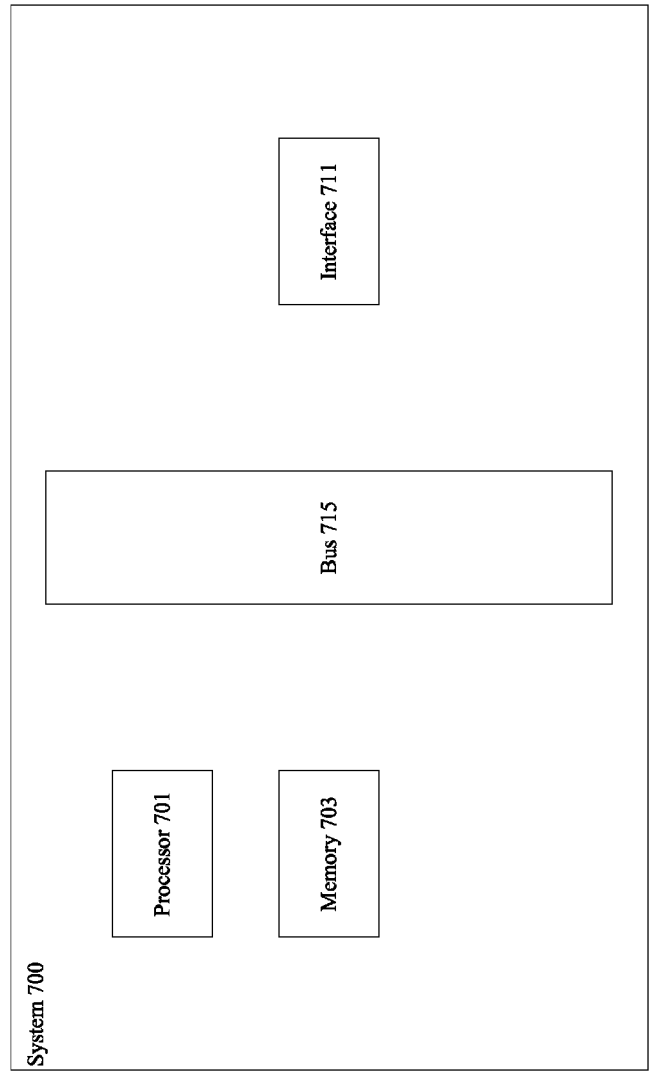

METHODS AND APPARATUS FOR ACTIVE OPTIMIZATION OF DATA

CROSS-REFERENCE To RELATED APPLICATIONS

This application claims the benefit under 35 U.S.C. 119(e) of U.S. Provisional Application No. 61/329,016 filed Apr. 28, 2010 and titled "ACTIVE OPTIMIZATION AND HEAT INDICES FOR FILE SYSTEMS AND BLOCK STORAGE," the entirety of which is incorporated by reference for all purposes.

TECHNICAL FIELD

The present disclosure relates to active optimization of data.

DESCRIPTION OF RELATED ART

Maintaining vast amounts of data is resource intensive not just in terms of the physical hardware costs but also in terms of system administration and infrastructure costs. Some mechanisms provide compression of data to save resources. For example, some file formats such as the Portable Document Format (PDF) are compressed. Some other utilities allow compression on an individual file level in a relatively inefficient manner.

Data deduplication refers to the ability of a system to eliminate data duplication across files to increase storage, transmission, and/or processing efficiency. A storage system which incorporates deduplication technology involves storing a single instance of a data segment that is common across multiple files. In some examples, data sent to a storage system is segmented in fixed or variable sized segments. Each segment is provided with a segment identifier (ID), such as a digital signature or a hash of the actual data. Once the segment ID is generated, it can be used to determine if the data segment already exists in the system. If the data segment does exist, it need not be stored again.

In many conventional implementations, entire files are taken offline and can not be accessed during optimization. System operation disruption is conventionally required during file optimization, particularly optimization of large files. Mechanisms for performing active optimization of files are limited. Consequently, mechanisms are provided to allow for efficient active file optimization.

BRIEF DESCRIPTION OF THE DRAWINGS

The disclosure may best be understood by reference to the following description taken in conjunction with the accompanying drawings, which illustrate particular embodiments of the present invention.

FIG. 4A illustrates a particular example of a filemap.

FIG. 4B illustrates a particular example of a datastore suitcase.

FIG. 5 illustrates a particular example of a deduplication dictionary.

FIG. 7 illustrates a particular example of a computer system.

DESCRIPTION OF PARTICULAR EMBODIMENTS

Figure 1:
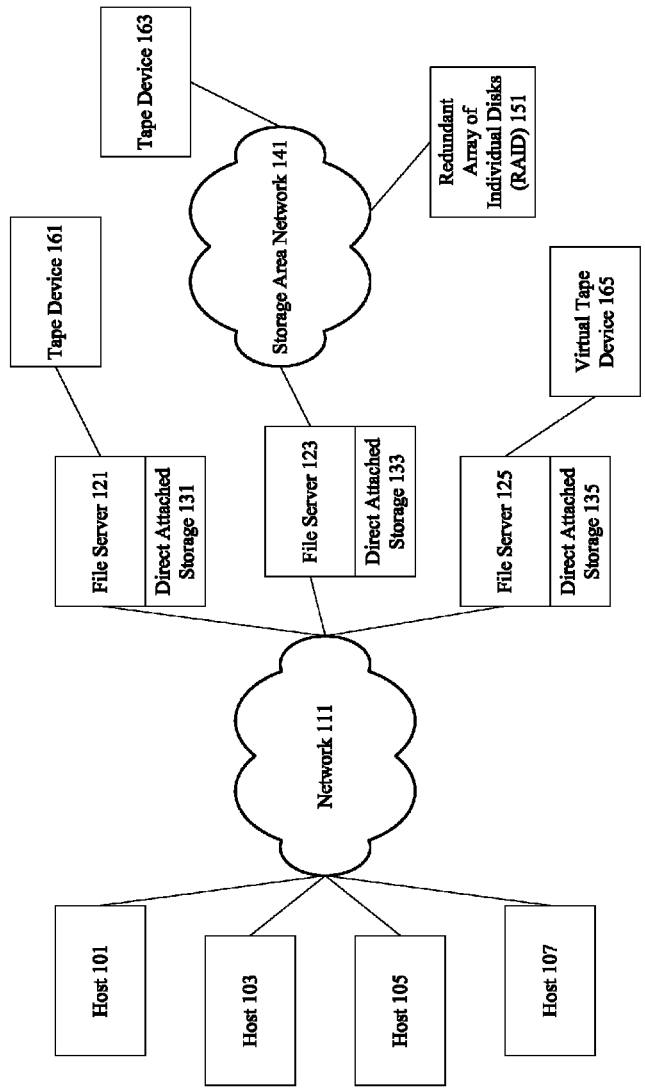
FIG. 1 illustrates a particular example of network that can use the techniques and mechanisms of the present invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of files. However, it should be noted that the techniques and mechanisms of the present invention apply to a variety of different data constructs including files, blocks, etc. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Techniques and mechanisms are provided to support live file optimization. Active I/O access to an optimization target is monitored during optimization. Active files need not be taken offline or made unavailable to an application during optimization and retain the ability to support file operations such as read, write, unlink, and truncate while an optimization engine performs deduplication and/or compression on active file ranges.

EXAMPLE EMBODIMENTS

Maintaining, managing, transmitting, and/or processing large amounts of data can have significant costs. These costs include not only power and cooling costs but system maintenance, network bandwidth, and hardware costs as well.

Some efforts have been made to reduce the footprint of data maintained by file servers and reduce the associated network traffic. A variety of utilities compress files on an individual basis prior to writing data to file servers. Compression algorithms are well developed and widely available. Some compression algorithms target specific types of data or specific types of files. Compressions algorithms operate in a variety of manners, but many compression algorithms analyze data to determine source sequences in data that can be mapped to shorter code words. In many implementations, the most frequent source sequences or the most frequent long source sequences are replaced with the shortest possible code words.

Data deduplication reduces storage footprints by reducing the amount of redundant data. Deduplication may involve identifying variable or fixed sized segments. According to various embodiments, each segment of data is processed using a hash algorithm such as MD5 or SHA-1. This process generates a unique ID, hash, or reference for each segment. That is, if only a few bytes of a document or presentation are changed, only changed portions are saved. In some instances, a deduplication system searches for matching sequences using a fixed or sliding window and uses references to identify matching sequences instead of storing the matching sequences again.

In a data deduplication system, the backup server working in conjunction with a backup agent identifies candidate files for backup, creates a backup stream and sends the data to the deduplication system. A typical target system in a deduplication system will deduplicate data as data segments are received. A block that has a duplicate already stored on the deduplication system will not need to be stored again. However, other information such as references and reference counts may need to be updated. Some implementations allow the candidate data to be directly moved to the deduplication system without using backup software by exposing a NAS drive that a user can manipulate to backup and archive files.

In an active file system, files can be requested to be optimized at any arbitrary time, by way of policy or by way of end user explicit directives. These files must still be considered active files and can be fairly large. These files cannot be taken off line while they are optimized, and applications must still have the ability to perform all file system operations such as read, write, unlink, and truncate on them while optimization is in progress. Although the term file is used throughout, it will be recognized that the techniques of the present invention apply to variety of forms of data such as data blocks. The term file will be used herein to include not just files, but variations of files and other organized groupings of data such as data blocks.

Conventional optimization involves deduplication and compression and is implemented on entire files without evaluating the frequency of use of particular file portions. Additionally, optimization solutions usually only apply to new files that are created. If there is an existing file that must be optimized, it must be made offline and unavailable to the application while it is optimized.

According to various embodiments, applications can be optimized while there are active I/O commands outstanding for that file. In particular embodiments, a system uses a variable heat index so that as different sections of the files and volume get hotter over different periods of time, the system adapts naturally to reduce the I/O access penalty for those frequently accessed sections.

According to various embodiments, the approach involves cooperation from the file system. The actual optimization process itself is separate from the file system operation. The file system will expose explicit techniques to perform this operation. While there are many possible implementations and descriptions of these techniques, the following depicts some of the functionality supported by the file system or block storage device.

In particular embodiments, various file system of block storage device functions are called by the optimization engine. These function calls may include the following:

Get_Optimizable_Ranges([IN] FILE_OR_VOLUME, [IN] START_OFFSET, [IN] END_OFFSET, [OUT] RANGES)

Aquire_Range_Lock([IN] FILE_OR_VOLUME, [IN] START_OFFSET, [IN] END_OFFSET, [OUT]RANGE_TOKEN)

Commit_Range_Lock([IN] FILE_OR_VOLUME, [IN] START_OFFSET, [IN] END_OFFSET, [IN]RANGE_TOKEN, [IN]RANGE_ID, [OUT] SUCCESS_CODE)

The following optimization engine functions may also be called by a file system or block storage device.

Read_Range([IN] RANGE ID, [IN] START_OFFSET, [IN] END_OFFSET, [OUT] BUFFER, [OUT] SIZE)

As mentioned before, the above functions are just an approximation of many different implementations of the concepts. These techniques are provided to outline the actual algorithms used during the operation of the apparatus.

Optimization Approach and Algorithm

According to various embodiments, it is recognized that newly written data is likely to be accessed in the near future. Furthermore, it is recognized that post process benefits from having no write penalty. Thus, the following algorithm will outline how a live file is ingested and optimized, even while file or block I/O is occurring.

While the description below is specific to files, the concept will apply to specific blocks of a volume in a block storage device as well, even though the description focuses on files.

Algorithm_Optimize_File(FILE)
BEGIN
Get_Optimizable_Ranges(FILE, 0, EOF, RANGES)
FOR (i in RANGES) DO
BEGIN According to various embodiments, it is first determined whether this range for this file has been optimized before. If this range has previously been optimized, this implies that the file system had externally modified this range and dead (unreferenced) data is being represented in the optimization engine. The unreferenced data needs to be cleaned up.

Cleanup_Optimized_Ranges_If_Any(FILE, RANGES[i].START, RANGES[i].END)

In particular embodiments, it is then determined if the region was very recently modified. If it was, then we can avoid optimizing this range since it is likely to be read and modified again imminently.

IF Test_Last_Modified_Stamp(RANGES[i].TIME_STAMP) THEN CONTINUE

This function will potentially find a smaller range size based on the actual implementation END=Find_Optimal_Range_End(FILE, RANGES[i].START, RANGES[i].END)

Acquire_Range_lock(FILE, RANGES[i].START, END, TOKEN)

The function is implementation specific and will actually perform the optimization:

Do_Optimization(FILE, RANGES[i].START, END, RANGE_ID)

According to various embodiments, the file width range is committed so that the file system knows the range has been successful optimized. According to various embodiments, the first width range is a subset of the file or a portion of the file.

In particular embodiments, the file system records the RANGE_ID for this range. It may be needed by the optimization engine to satisfy a read request to that range.

Commit_Range_Lock(FILE, RANGES[i].START, END, TOKEN, RANGE_ID, SUCCESS_CODE)

According to various embodiments, the success code is tested. If the file was modified while optimization was occurring, then the optimization performed has to be aborted. File access during optimization can be detected by implementation specific data maintained in the TOKEN parameter and is decided by the file system. In particular embodiments, cleanup can be performed here or left to step one of this process.

Test_And_Cleanup(FILE, RANGES[i].START, END, TOKEN RANGE_ID, SUCCESS_CODE)
    END
END The above algorithm may be run on every file in the file system, continually, even visiting files it has already visited. The process can be run with varying degrees of frequency and aggressiveness.

According to various embodiments, the File System itself is responsible for maintaining ranges of a file and indications of whether any offsets within those ranges have been modified. The granularity of a range is left to the discretion of the implementation. In one implementation, variable range sizes may be used. In another implementation, fixed width range sizes may be used. In the case of fixed width range sizes, even if any byte of that range has been modified, the entire range is marked as dirty and will be made available in the call to Get_Optimizable_Ranges( ).

Whenever a write operation happens to a range, the file system directs the write to the original file in the specified ranges, and flips the optimization bits of those ranges to 0. This indicates that those ranges are now un-optimized (or at least contain partially newly written data).

These ranges will be picked up during a subsequent visit of that file by the optimization engine through the Get_Optimizable_Ranges( ) method. If the timestamp of that range is old enough, it will be optimized.

On any read operation, the file system will consult the optimization bit for that range. If the bit is set, then the file system will reference the RANGE_ID if needed and provide that to the optimization engine. The optimization engine can use the RANGE_ID as a pointer to the optimized data and perform the un-optimization processing.

The above approach can successfully handle writing to an optimized file without going to the optimization engine and hence incurring an optimization overhead. The writes are directly handled by the file system and the file is modified without the knowledge of the optimization engine. When a read or write occurs, the file system has enough information stored in the range specific data structures to know where the data needs to be read from. In all cases, the writes go straight to the original file and bypass the optimization engine. Hence there is no equivalent of a Write_Range( ) function in this apparatus.

Furthermore, any shift in the heat of the file is successfully handled by this approach. As different ranges in a file get colder over time, the timestamp captures the age of that range. If a range is old enough, it will be optimized as can be seen in the inner loop. As previously cold ranges are written to, there is no write penalty. And since the timestamp will capture the new age of that range, it will not be optimized, thus all reads to that freshly written range will go to the un-optimized file and handled directly by the file system with no additional penalty.

Finally, this scheme easily demonstrates how an existing live file, of which no section has been optimized, can be ingested in whole, or in part, into the optimization engine.

In many real world cases, such as virtual machine applications or databases, some portions of a file are in constant use. Analyzing the algorithm above easily demonstrates how those ranges are optimized, no matter how small the threshold for the range timestamp.

FIG. 1A illustrates a particular example of a network that can use the techniques and mechanisms of the present invention. Hosts 101, 103, 105, and 107 are connected to file servers 121, 123, and 125 through a network 111. Hosts may include computer systems, application servers, devices, etc. A network 111 may be a single network or a combination of different networks. According to various embodiments, each host 101, 103, 105, and 107 runs applications that require data storage. The file servers 121, 123, and 125 provide data storage through active storage mechanisms such as disk arrays. One example of active storage is a Redundant Array of Individual Disks (RAID) 151 connected to file server 123 through storage area network (SAN) 141. The file servers 121, 123, and 125 also provide data storage through passive storage mechanisms such as tape devices 161 and 163, and virtual tape device 165.

According to various embodiments, hosts 101, 103, 105, and 107 are connected to file servers 121, 123, and 125 using file level protocols such as Server Message Block (SMB), Network File System (NFS), or the Andrew File System (AFS) that are capable of providing network attached storage (NAS) to heterogeneous clients. In particular examples, NAS includes both a file system and storage. SMB, NFS, and AFS generally allow hosts 101, 103, 105, and 107 to access data at the file level. The file servers 121, 123, and 125 then use block level protocols such as serial advanced technology attachment (SATA), Internet Small Computer Systems Interface (iSCSI), and storage area networks (SANs) to access individual blocks of data.

Block level protocols generally do not provide any file system capabilities to file servers but instead leave file system operations on the application server side. The data accessed by the file servers 121, 123, and 125 may be physically stored on direct attached storage 131, 133, and 135, such as hard drives included in the corresponding file servers. Alternatively, the data may be physically stored on tape devices 161 or 163, or on virtual tape device 165. A virtual tape device 165 may be implemented as an array of disks. The data may also be stored on RAID 151 connected over a SAN 141.

According to various embodiments, a segment ID index may be implemented at hosts 101, 103, 105, and 107, at network 111, or at file servers 121, 123, and 125 or at a combination of entities. The segment ID generator intercepts requests to store a data segment and determines whether the data segment has already been stored at a target system. For example, if a client associated with host 101 requests deduplication of multiple files in a directory, the segment ID generator determines what segments in the multiple files have already been deduplicated. For segments already deduplicated, references and reference counts may be updated, but the data segments need not be transmitted again to the target system for deduplication. The determination can be made by comparing segment IDs or hashes of segments for deduplication.

Figure 2:
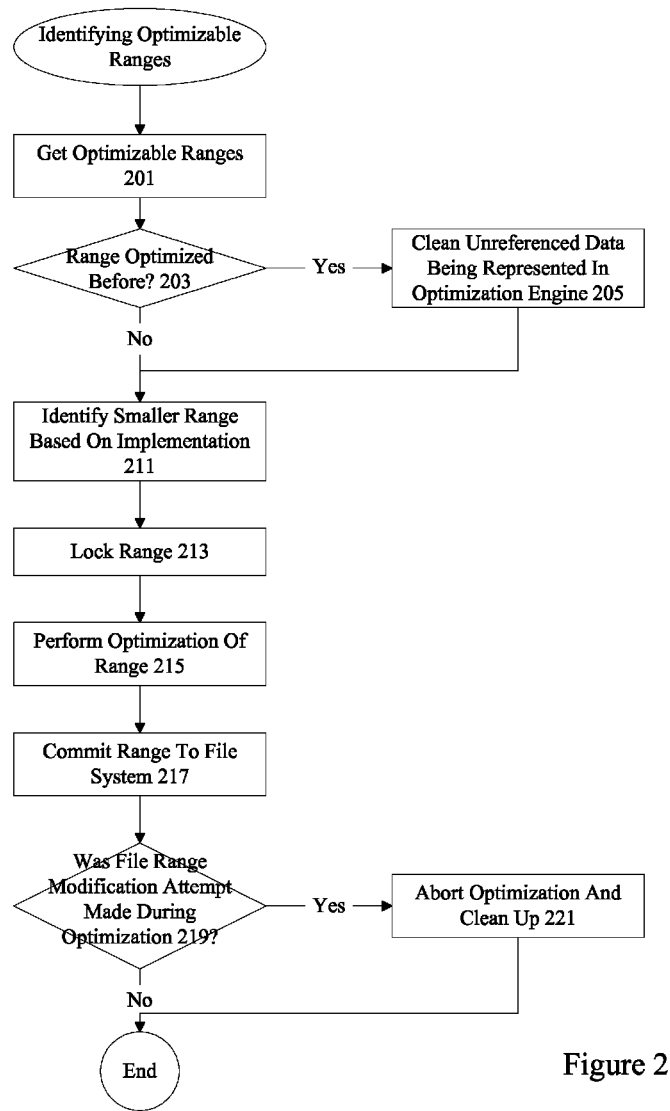
FIG. 2 illustrates one example of a technique for performing optimization.

FIG. 2 illustrates one example of a technique for performing optimization. According to various embodiments, it is first determined at 201 whether this range for this file has been optimized before. If this range has been optimized before at 203, this implies that the file system had externally modified this range and dead (unreferenced) data is being represented in the optimization engine. The unreferenced data is cleaned at 205.

Cleanup_Optimized_Ranges_If_Any(FILE, RANGES[i].START, RANGES [i].END)

In particular embodiments, it is then determined if the region was very recently modified. If it was, then we can avoid optimizing this range since it is likely to be read and modified again imminently.

IF Test_Last_Modified_Stamp(RANGES[i].TIME_STAMP) THEN CONTINUE

This function will potentially find a smaller range size based on the actual implementation at 211. The range can then be locked at 213.

END=Find_Optimimal_Range_End(FILE, RANGES[i].START, RANGES[i].END)
    Acquire_Range_lock(FILE, RANGES[i].START, END, TOKEN)

The function is implementation specific and will actually perform the optimization at 215:

Do_Optimization(FILE, RANGES[i].START, END, RANGE_ID)

According to various embodiments, the file width range is committed at 217 so that the file system knows the range has been successful optimized. In particular embodiments, the file system records the RANGE ID for this range. It may be needed by the optimization engine to satisfy a read request to that range.

Commit_Range_Lock(FILE, RANGES[i].START, END, TOKEN, RANGE_ID, SUCCESS_CODE)

According to various embodiments, the success code is tested. If the file was modified while optimization was occurring at 219, then the optimization performed has to be aborted at 221. File access during optimization can be detected by implementation specific data maintained in the TOKEN parameter and is decided by the file system. In particular embodiments, cleanup can be performed here or left to step one of this process.

Test_And_Cleanup(FILE, RANGES [i].START, END, TOKEN RANGE_ID, SUCCESS_CODE)
    END
    END The above algorithm may be run on every file in the file system, continually, even visiting files it has already visited. The process can be run with varying degrees of frequency and aggressiveness.

According to various embodiments, the file system itself is responsible for maintaining ranges of a file and indications of whether any offsets within those ranges have been modified. The granularity of a range is left to the discretion of the implementation. In one implementation, variable range sizes may be used. In another implementation, fixed width range sizes may be used. In the case of fixed width range sizes, even if any byte of that range has been modified, the entire range is marked as dirty and will be made available in the call to Get_Optimizable_Ranges( ).

Figure 3:
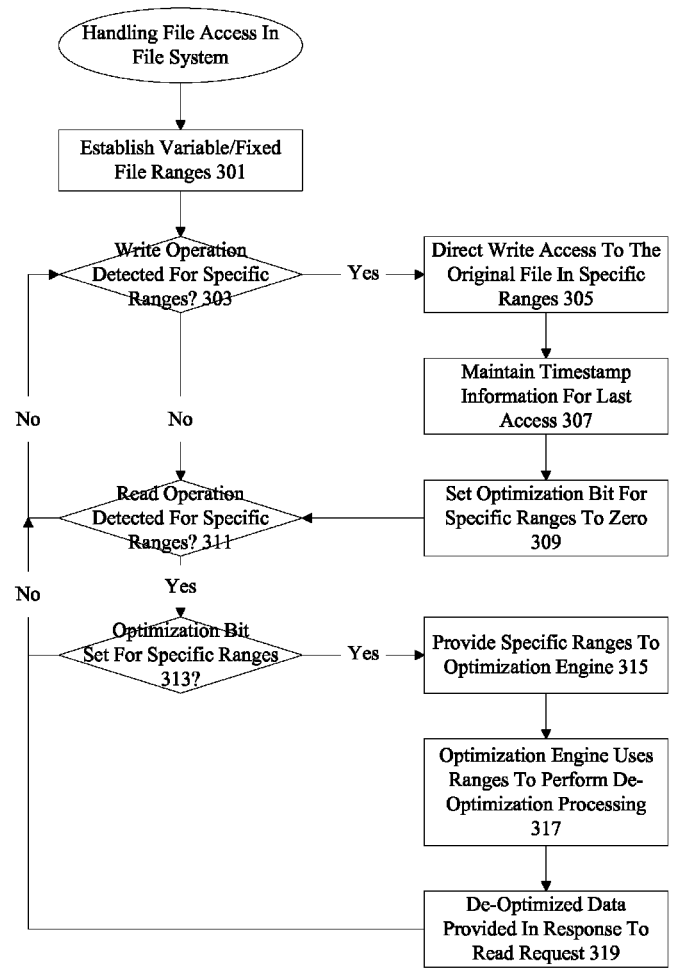
FIG. 3 illustrates one example of a technique for handling file access in a file system.

FIG. 3 illustrates one technique for handling file access. According to various embodiments, variable/fixed file ranges are established at 301. Whenever a write operation happens to a range at 303, the file system directs the write to the original file in the specified ranges at 305, maintains timestamp information at 307, and flips the optimization bits of those ranges to 0 at 309. This indicates that those ranges are now un-optimized (or at least contain partially newly written data).

These ranges will be picked up during a subsequent visit of that file by the optimization engine through the Get_Optimizable_Ranges( ) method. If the timestamp of that range is old enough, it will be optimized.

On any read operation at 311, the file system will consult the optimization bit for that range at 313. If the bit is set, then the file system will reference the RANGE_ID if needed and provide that to the optimization engine at 315. The optimization engine can use the RANGE_ID as a pointer to the optimized data and perform the de-optimization processing 317. The de-optimized data is provided in response to the read request at 319

The above approach can successfully handle writing to an optimized file without going to the optimization engine and hence incurring an optimization overhead. The writes are directly handled by the file system and the file is modified without the knowledge of the optimization engine. When a read or write occurs, the file system has enough information stored in the range specific data structures to know where the data needs to be read from. In all cases, the writes go straight to the original file and bypass the optimization engine. Hence there is no equivalent of a Write_Range( ) method in this apparatus.

Furthermore, any shift in the heat of the file is successfully handled by this approach. As different ranges in a file get colder over time, the timestamp captures the age of that range. If a range is old enough, it will be optimized as can be seen in the inner loop. As previously cold ranges are written to, there is no write penalty. And since the timestamp will capture the new age of that range, it will not be optimized, thus all reads to that freshly written range will go to the un-optimized file and handled directly by the file system with no additional penalty.

Finally, this scheme easily demonstrates how an existing live file, of which no section has been optimized, can be ingested in whole, or in part, into the optimization engine.

In many real world cases, such as virtual machine applications or databases, some portions of a file are in constant use. Analyzing the algorithm above easily demonstrates how those ranges are optimized, no matter how small the threshold for the range timestamp.

FIG. 4A illustrates one example of a filemap and FIG. 4B illustrates a corresponding datastore suitcase created after optimizing a file X. Filemap file X 401 includes offset 403, index 405, and lname 407 fields. According to various embodiments, each segment in the filemap for file X is 8K in size. In particular embodiments, each data segment has an index of format <Datastore Suitcase ID>. <Data Table Index>. For example, 0.1 corresponds to suitcase ID 0 and datatable index 1. while 2.3 corresponds to suitcase ID 2 and database index 3. The segments corresponding to offsets 0K, 8K, and 16K all reside in suitcase ID 0 while the data table indices are 1, 2, and 3. The lname field 407 is NULL in the filemap because each segment has not previously been referenced by any file.

FIG. 4B illustrates one example of a datastore suitcase corresponding to the filemap file X 401. According to various embodiments, datastore suitcase 471 includes an index portion and a data portion. The index section includes indices 453, data offsets 455, and data reference counts 457. The data section includes indices 453, data 461, and last file references 463. According to various embodiments, arranging a data table 451 in this manner allows a system to perform a bulk read of the index portion to obtain offset data to allow parallel reads of large amounts of data in the data section.

According to various embodiments, datastore suitcase 471 includes three offset, reference count pairs which map to the data segments of the filemap file X 401. In the index portion, index 1 corresponding to data in offset-data A has been referenced once. Index 2 corresponding to data in offset-data B has been referenced once. Index 3 corresponding to data in offset-data C has been referenced once. In the data portion, index 1 includes data A and a reference to File X 401 which was last to place a reference on the data A. Index 2 includes data B and a reference to File X 401 which was last to place a reference on the data B. Index 3 includes data C and a reference to File X 401 which was last to place a reference on the data C.

According to various embodiments, the dictionary is a key for the deduplication system. The dictionary is used to identify duplicate data segments and point to the location of the data segment. When numerous small data segments exist in a system, the size of a dictionary can become inefficiently large. Furthermore, when multiple optimizers nodes are working on the same data set they will each create their own dictionary. This approach can lead to suboptimal deduplication since a first node may have already identified a redundant data segment but a second node is not yet aware of it because the dictionary is not shared between the two nodes. Thus, the second node stores the same data segment as an original segment. Sharing the entire dictionary would be possible with a locking mechanism and a mechanism for coalescing updates from multiple nodes. However, such mechanisms can be complicated and adversely impact performance.

Consequently, a work partitioning scheme can be applied based on segment ID or hash value ranges for various data segments. Ranges of hash values are assigned to different nodes within the cluster. If a node is processing a data segment which has a hash value which maps to another node, it will contact the other node that owns the range to find out if the data segments already exist in a datastore.

FIG. 5 illustrates multiple dictionaries assigned to different segment ID or hash ranges. Although hash ranges are described, it should be recognized that the dictionary index can be hash ranges, reference values, or other types of keys. According to various embodiments, the hash values are SHA1 hash values. In particular embodiments, dictionary 501 is used by a first node and includes hash ranges from 0x0000 0000 0000 0000-0x0000 0000 FFFF FFFF. Dictionary 551 is used by a second node and includes hash ranges from 0x0000 0001 0000 0000-0X0000 0001 FFFF FFFF. Hash values 511 within the range for dictionary 501 are represented by symbols a, b, and c for simplicity. Hash values 561 within the range for dictionary 551 are represented by symbols i, j, and k for simplicity. According to various embodiments, each hash value in dictionary 501 is mapped to a particular storage location 521 such as location 523, 525, or 527. Each hash value in dictionary 551 is mapped to a particular storage location 571 such as location 573, 575, and 577.

Having numerous small segments increases the likelihood that duplicates will be found. However, having numerous small segments decreases the efficiency of using the dictionary itself as well as the efficiency of using associated filemaps and datastore suitcases.

Figure 6A:
FIG. 6A illustrates a particular example of a file having a single data segment.

FIG. 6A illustrates one example of a non-container file. According to various embodiments, container files such as ZIP files, archives, productivity suite documents such as .docx, .xlsx, etc., include multiple objects of different types. Non-container files such as images and simple text files typically do not contain disparate objects.

According to various embodiments, it is recognized that certain types of non-container files do not benefit from having a segment size smaller than the size of the file itself. For example, many image files such as .jpg and .tiff files do not have many segments in common with other .jpg and .tiff files. Consequently, selecting small segments for such file types is inefficient. Consequently, the segment boundaries for an image file may be the boundaries for the file itself. For example, noncontainer data 601 includes file 603 of a type that does not benefit from finer grain segmentation. File types that do not benefit from finer grain segmentation include image files such as .jpg, .png, .gif, .and .bmp files. Consequently, file 603 is provided with a single segment 605. A single segment is maintained in the deduplication dictionary. Providing a single large segment encompassing an entire file can also make compression of the segment more efficient. According to various embodiments, multiple segments encompassing multiple files of the same type are compressed at the same time. In particular embodiments, only segments having data from the same type of file are compressed using a single compression context. It is recognized that specialized compressors may be applied to particular segments associated with the same file type.

Figure 6B:
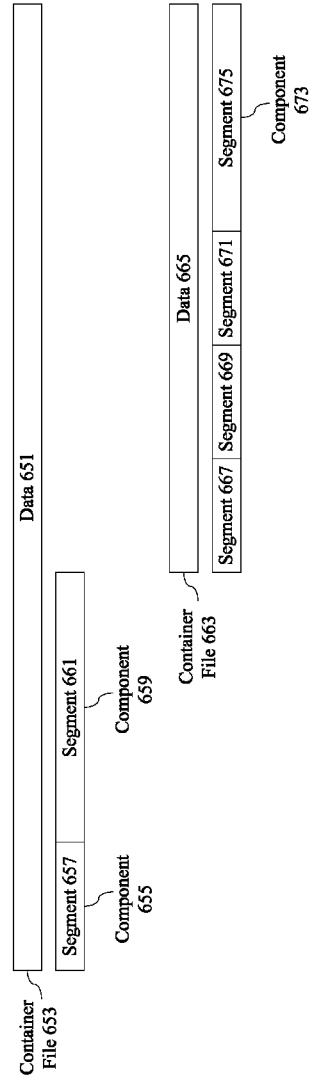
FIG. 6B illustrates a particular example of a file having multiple data segments and components.

FIG. 6B illustrates one example of a container file having multiple disparate objects. Data 651 includes a container file that does benefit from more intelligent segmentation. According to various embodiments, segmentation can be performed intelligently while allowing compression of multiple segments using a single compression context. Segmentation can be implemented in an intelligent manner for deduplication while improving compression efficiency. Instead of selecting a single segment size or using a sliding segment window, file 653 is delayered to extract file components. For example, a .docx file may include text, images, as well as other container files. For example, file 653 may include components 655, 659, and 673. Component 655 may be a component that does not benefit from finer grain segmentation and consequently includes only segment 657. Similarly, component 659 also includes a single segment 661. By contrast, component 673 is actually an embedded container file 663 that includes not only data that does benefit from additional segmentation but also includes component 673. For example, data 665 may include text. According to various embodiments, the segment size for text may be a predetermined size or a dynamic or tunable size. In particular embodiments, text is separated into equal sized segments 667, 669, and 671. Consequently, data may also include a non-text object 673 that is provided with segment boundaries aligned with the object boundaries 675.

A variety of devices and applications can implement particular examples of network efficient deduplication. FIG. 7 illustrates one example of a computer system. According to particular example embodiments, a system 700 suitable for implementing particular embodiments of the present invention includes a processor 701, a memory 703, an interface 711, and a bus 715 (e.g., a PCI bus). When acting under the control of appropriate software or firmware, the processor 701 is responsible for such tasks such as optimization. Various specially configured devices can also be used in place of a processor 701 or in addition to processor 701. The complete implementation can also be done in custom hardware. The interface 711 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 700 uses memory 703 to store data and program instructions and maintained a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method, comprising:
   identifying a first optimizable range in a first active file, the first active file supporting active read/write access associated with a file system, wherein the first optimizable range is a first subset of data in the first active file;
   locking the first optimizable range;
   performing optimization including deduplication on the first optimizable range, wherein one or more file operations are performed during optimization, the one or more file operations involving a second subset of data in the first active file, the second subset of data being different than the first subset of data;
   aborting optimization on the first optimizable range upon detecting a write access to the first optimizable range.

2. The method of claim 1, further comprising determining whether the first optimizable range is frequently accessed.

3. The method of claim 1, wherein optimization further includes compression.

4. The method of claim 1, wherein the first active file comprises a plurality of optimizable ranges.

5. The method of claim 1, further comprising committing the first optimizable range to the file system after performing optimization on the first optimizable range.

6. The method of claim 1, further comprising performing cleanup after aborting optimization.

7. The method of claim 1, further comprising identifying a second optimizable range in the first active file.

8. The method of claim 7, further comprising locking the second optimizable range and performing optimization on the second optimizable range.

9. The method of claim 8, further comprising committing the second optimizable range to the file system.

10. A system, comprising:
    a processor configured to identify a first optimizable range in a first active file, the first active file supporting active read/write access associated with a file system, wherein the first optimizable range is a subset of data in the first active file and lock the first optimizable range, the processor further configured to perform optimization including deduplication on the first optimizable range, wherein one or more file operations are performed during optimization, the one or more file operations involving a second subset of data in the first active file, the second subset of data being different than the first subset of data;
    an interface configured to detect a write access to the first optimizable range and trigger an abort of the optimization on the first optimizable range upon detecting the write access.

11. The system of claim 10, wherein it is further determined whether the first optimizable range is frequently accessed.

12. The system of claim 10, wherein optimization further includes compression.

13. The system of claim 10, wherein the first active file comprises a plurality of optimizable ranges.

14. The system of claim 10, wherein the first optimizable range is committed to the file system after performing optimization on the first optimizable range.

15. The system of claim 10, wherein cleanup is performed after aborting optimization.

16. The system of claim 10, wherein a second optimizable range in the first active file is identified.

17. The system of claim 16, wherein the second optimizable range is locked and optimization is performed on the second optimizable range.

18. The system of claim 17, wherein the second optimizable range is committed to the file system.

19. A non-transitory computer readable medium, comprising:
    computer code for identifying a first optimizable range in a first active file, the first active file supporting active read/write access associated with a file system, wherein the first optimizable range is a subset of data in the first active file;
    computer code for locking the first optimizable range;
    computer code for performing optimization including deduplication on the first optimizable range, wherein one or more file operations are performed during optimization, the one or more file operations involving a second subset of data in the first active file, the second subset of data being different than the first subset of data;
    computer code for aborting optimization on the first optimizable range upon detecting a write access to the first optimizable range.

20. The non-transitory computer readable medium of claim 19, further comprising means for determining whether the first optimizable range is frequently accessed.

* * * * *